(12) United States Patent
Böcker et al.

(10) Patent No.: US 10,263,399 B2
(45) Date of Patent: Apr. 16, 2019

(54) MULTIPLE LATCHING FEET FOR ELECTRICAL CONNECTOR ASSEMBLY

(71) Applicant: Weidmüller Interface GmbH & Co. KG, Detmold (DE)

(72) Inventors: Marc Böcker, Steinheim (DE); Stephan Lange, Lemgo (DE); Gerald Busch, Lage (DE)

(73) Assignee: Weidmüller Interface GmbH & Co. KG (DE)

( * ) Notice: Subject to any disclaimer, the term of this patent is extended or adjusted under 35 U.S.C. 154(b) by 52 days.

(21) Appl. No.: 15/545,833

(22) PCT Filed: Jan. 14, 2016

(86) PCT No.: PCT/EP2016/050664
§ 371 (c)(1),
(2) Date: Jul. 24, 2017

(87) PCT Pub. No.: WO2016/128169
PCT Pub. Date: Aug. 18, 2016

(65) Prior Publication Data
US 2018/0097339 A1    Apr. 5, 2018

(30) Foreign Application Priority Data
Feb. 12, 2015   (DE) .................... 20 2015 100 696 U

(51) Int. Cl.
*H01R 9/26*      (2006.01)
*H02B 1/052*     (2006.01)
*H02B 1/04*      (2006.01)

(52) U.S. Cl.
CPC ........... *H02B 1/052* (2013.01); *H01R 9/2608* (2013.01); *H02B 1/041* (2013.01)

(58) Field of Classification Search
CPC .... H02B 1/0523; H02B 1/041; H02B 1/0526; H01R 9/2608; H01R 9/2675; H01R 9/26;
(Continued)

(56) References Cited

U.S. PATENT DOCUMENTS 4,647,141 A * 3/1987 Muench .............. H05K 7/1417
                                                                  439/521
4,776,815 A * 10/1988 Baillet ................ H01R 9/2691
                                                                  439/712
(Continued)

FOREIGN PATENT DOCUMENTS

DE     102004062524 A1     7/2006
DE     202009005808 U1     9/2010
(Continued)

*Primary Examiner* — Amy Cohen Johnson
*Assistant Examiner* — Matthew T Dzierzynski
(74) *Attorney, Agent, or Firm* — Laubscher & Laubscher, P.C.

(57) ABSTRACT

A latching foot assembly for latching electrical components on a support rail includes first and second latching feet or members each including first and second resilient clamping portions between which the support rail is latched or grasped. A latching finger is integral with the first clamping portion of each latching foot. The first clamping portions of the latching feet are connected in interlocking fashion. The latching finger of the first clamping portion of the first latching foot has a support surface for supporting the support rail in a latched state. The support surface extends farther in the direction of the second clamping portion than a support surface for supporting the support rail in the latched state of the latching finger of the first clamping portion of the at least one second latching foot.

14 Claims, 7 Drawing Sheets

(58) Field of Classification Search
CPC .. H01R 4/4827; H01R 9/2625; H01R 9/2633; H01R 9/2408; H01R 13/501; H01R 13/508; H01R 13/64
USPC .................. 439/716, 709, 532, 712, 715, 94
See application file for complete search history.

(56) References Cited

U.S. PATENT DOCUMENTS

| | | | | |
|---|---|---|---|---|
| 5,090,922 | A * | 2/1992 | Rymer | H01R 9/2608 439/716 |
| 5,145,418 | A * | 9/1992 | Moranski | H01R 9/2608 439/712 |
| 5,480,310 | A * | 1/1996 | Baum | H01R 9/2691 439/716 |
| 5,907,476 | A * | 5/1999 | Davidsz | H02B 1/052 361/729 |
| 6,224,429 | B1 * | 5/2001 | Bernhards | H01R 9/2608 439/709 |
| 7,192,316 | B1 * | 3/2007 | Pollmann | H01R 9/2675 439/716 |
| 7,540,790 | B2 * | 6/2009 | Weber | H02B 1/052 439/716 |
| 7,658,639 | B2 * | 2/2010 | Hoppmann | H01R 4/4827 439/142 |
| 7,686,626 | B2 * | 3/2010 | Wu | H01R 4/64 439/95 |
| 7,862,389 | B2 * | 1/2011 | Pizzi | H01R 4/28 439/709 |
| 8,853,575 | B2 * | 10/2014 | Buttner | H02B 1/052 200/293 |
| 9,634,406 | B2 * | 4/2017 | Pizzi | H01R 9/26 |
| 9,667,005 | B2 * | 5/2017 | Pizzi | H01R 9/2675 |
| 9,831,569 | B2 * | 11/2017 | Hoppmann | H01R 9/2691 |
| 9,954,331 | B2 * | 4/2018 | Peach | H01R 9/2666 |
| 10,044,119 | B2 * | 8/2018 | Janzen | H01R 4/242 |
| 2008/0169175 | A1 * | 7/2008 | Weber | H02B 1/052 200/295 |
| 2010/0203773 | A1 * | 8/2010 | Henke | H01R 9/2633 439/709 |

FOREIGN PATENT DOCUMENTS

| | | |
|---|---|---|
| DE | 202010008042 U1 | 11/2011 |
| EP | 0327708 A2 | 8/1989 |
| WO | 2008071424 A3 | 9/2008 |

* cited by examiner

MULTIPLE LATCHING FEET FOR ELECTRICAL CONNECTOR ASSEMBLY

This application is a § 371 National Stage Entry of PCT/EP2016/050664 filed Jan. 14, 2016 entitled "An Arrangement of Multiple Latching Feet for an Assembly, and Assembly." PCT/EP2016f/050664 claims priority of DE 202015/00696.9 filed Feb. 12, 2015. The entire contents of these applications are incorporated herein by reference in their entireties.

BACKGROUND OF THE INVENTION

The present invention relates to an arrangement of a plurality of latching feet or members for an assembly, in particular an electrical assembly, for latching onto a support rail.

Such latching feet are used in electrical assemblies, for example in the case of electrical conductors and/or bus systems and/or modules of complex electronic devices, in which the electrical assemblies are latched side by side onto a support rail.

These electrical assemblies can usually by used in a modular manner in complex electrical systems, wherein even after the first installation, it is often necessary to replace individual assemblies with other assemblies. For this purpose, it is necessary to be able to detach these assemblies from the support rail with comparatively low effort.

As is known, for example, from DE 20 2009 005 808 U1, latching feet are used for fastening to a support rail, wherein the latching feet have two clamping parts between which the support rail can be latched or grasped and a latching finger which engages behind is integrally attached to at least one of the clamping parts of a latching foot latched or mounted onto the support rail, by which the latching foot can be latched onto the support rail. This type of latching has generally proven its worth. However, the effort involved in unlatching several adjacently arranged latching feet is relatively high.

It is the object of the present invention to provide an arrangement of a plurality of latching feet for an assembly which can be mounted in a simple manner and can be dismounted quickly in a similarly simple way.

This object is achieved by a latching foot group for an assembly comprising a plurality of latching feet which are arranged next to one another and which can be latched onto the support rail.

SUMMARY OF THE INVENTION

The latching foot group according to the invention has a first latching foot and at least one second latching foot, wherein each of the latching feet has a resiliently configured first clamping part and a second clamping part, between which the support rail can be latched or grasped. A latching finger engaging behind the support rail when the latching feet are latched onto the support rail is integrally formed on the first clamping part of each of the latching feet. The first clamping parts of the latching feet can be positively connected to one another.

In this case, only the first clamping part of the first latching foot has a tool receiving area for the application of an unlatching tool, wherein the latching finger of the first clamping part of the first latching foot has a support surface which extends further in the direction of the second clamping part as a support surface for supporting the support rail in the latched state than a support surface for supporting the support rail in the latched state of the latching finger of the first clamping part of the at least one second latching foot.

A simple and reliable latching of the latching feet of the latching foot group as well as a simple and quick releasing disengagement is made possible with a latching foot group formed in this manner, since only one tool has to be applied to the first latching foot for unlatching with which the latching finger of the first latching foot can be bent out from its position latching the support rail. The further latching feet, which are connected in an interlocking manner to one another by the first latching foot, are moved simultaneously by the interlocked connection.

The unlatching of the latching foot group from the support rail is further facilitated in that the latching fingers of the at least one second latching foot extend in the direction of the second clamping part less than the latching finger of the first latching foot on which the tool engages.

According to an advantageous embodiment of the invention, the first clamping part of the latching feet is formed like a frame, with at least two spring legs extending from a base web, which are connected to one another at their ends remote from the base web by a connecting web. In this case, the spring legs allow an elastic connection of the latching fingers to the first clamping part, so that by engaging the unlatching tool on the tool receiving area of the first clamping part of the first latching foot, the latching fingers can be pressed with little effort out of the position latching or grasping the support rail to a position releasing the support rail.

According to a further embodiment of the invention, the connecting webs have at least one recess for receiving at least one plug element on a first surface facing a first clamping part of a second latching foot, wherein the at least one plug element protrudes from a second surface, which is opposite the first surface, of the connecting webs of the first clamping part of the at least one second latching foot. This creates a plug-in connection that is simple to produce between the individual latching feet, wherein the plug elements project transversely in relation to an unlatching direction X from the at least one second latching foot.

According to a further preferred embodiment of the invention, the first clamping part of the first latching foot has at least one stiffening web extending between the base web and the connecting web in order to reinforce the latching of the latching feet on the support rail. The first clamping parts of the at least one second latching foot are preferably designed without such stiffening webs and are thus easier to bend in the unlatching direction X, which additionally facilitates the unlatching of the latching foot group.

According to a further advantageous embodiment of the invention, the tool receiving area is designed as a receiving groove between a clamping web arranged on the connecting web of the first clamping part of the first latching foot. A screwdriver or the like can be used as an unlatching tool, for example, which engages in the tool receiving area for unlatching and lifts the clamping web and thus the first clamping part away from the support rail in the unlatching direction X.

For good accessibility of the tool receiving area, it is preferably arranged as an end of the first clamping part remote from the second clamping part.

The first latching foot provided with the tool receiving area is particularly preferably positioned on an outer side of the latching foot group.

In accordance with a further preferred embodiment, the latching feet are preferably produced as injection-moulded parts and can thus be produced cost-effectively.

BRIEF DESCRIPTION OF THE FIGURES

A preferred embodiment of the invention is explained in closer detail below with reference to the appended drawings, wherein.

DETAILED DESCRIPTION

In the following description of the figures, terms such as above, below, left, right, front, rear, etc. refer exclusively to the exemplary representation and position of the latching foot group, latching foot or member, clamping part, support rail, latching finger, base web, connecting web and the like, as selected from the respective figures. These terms are not to be understood as limiting, that is to say, these references can change by different working positions or the mirror-symmetrical design or the like.

Figure 1:
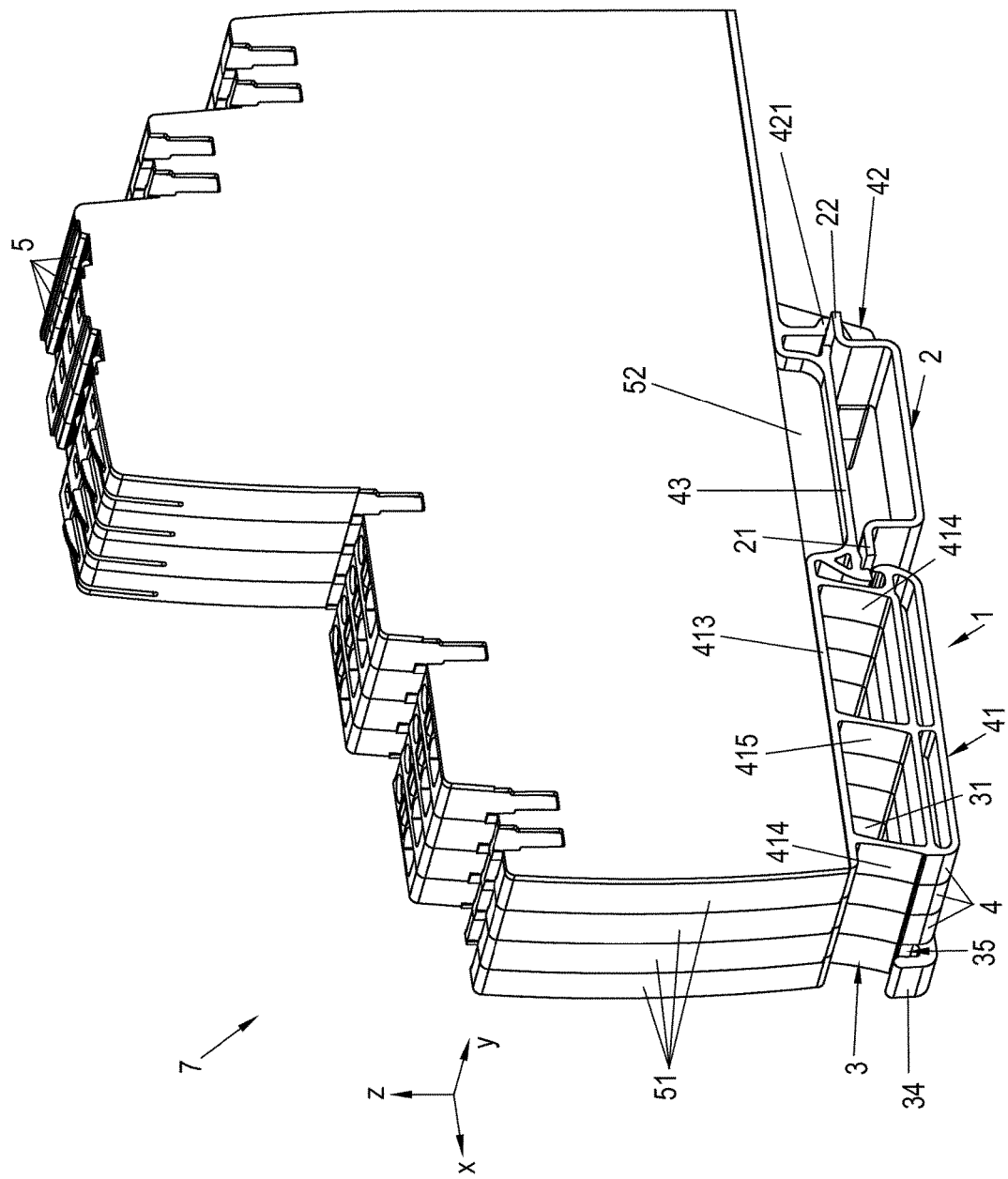
FIG. 1 shows a perspective view of an electrical assembly with an embodiment of a latching foot group according to the invention which is fastened therein.

In FIG. 1, reference numeral 7 designates as a whole an assembly, in particular an electrical assembly, with a plurality of housings 5 arranged side by side on a support rail 2. The housings 5 of the assembly 7 essentially include a housing upper part 51 in which electrical components and connecting or contact elements are preferably mounted, as well as a housing lower part, preferably integrally formed thereon, with one or more latching or fastening feet or members 3, 4 for latching or fastening the housing 5 onto the support rail 2.

In this case, the support rail 2 is designed as a hat-shaped support rail 2 with two free outer edges 21, 22 which are preferably aligned parallel to one another in a plane and can be latched onto or into the latching feet 3, 4 or be released therefrom.

A plurality of such latching feet 3, 4, which can be latched side by side onto the hat-shaped support rail 2, jointly form a latching foot group 1, which has at least one first latching foot 3 and at least one second latching foot 4 which is different from the first latching foot.

Each of these latching feet 3, 4, preferably made as injection-moulded parts, has a resiliently designed first clamping part 31, 41 as well as a second clamping part 42, between which the support rail 2 can be latched.

Figure 4:
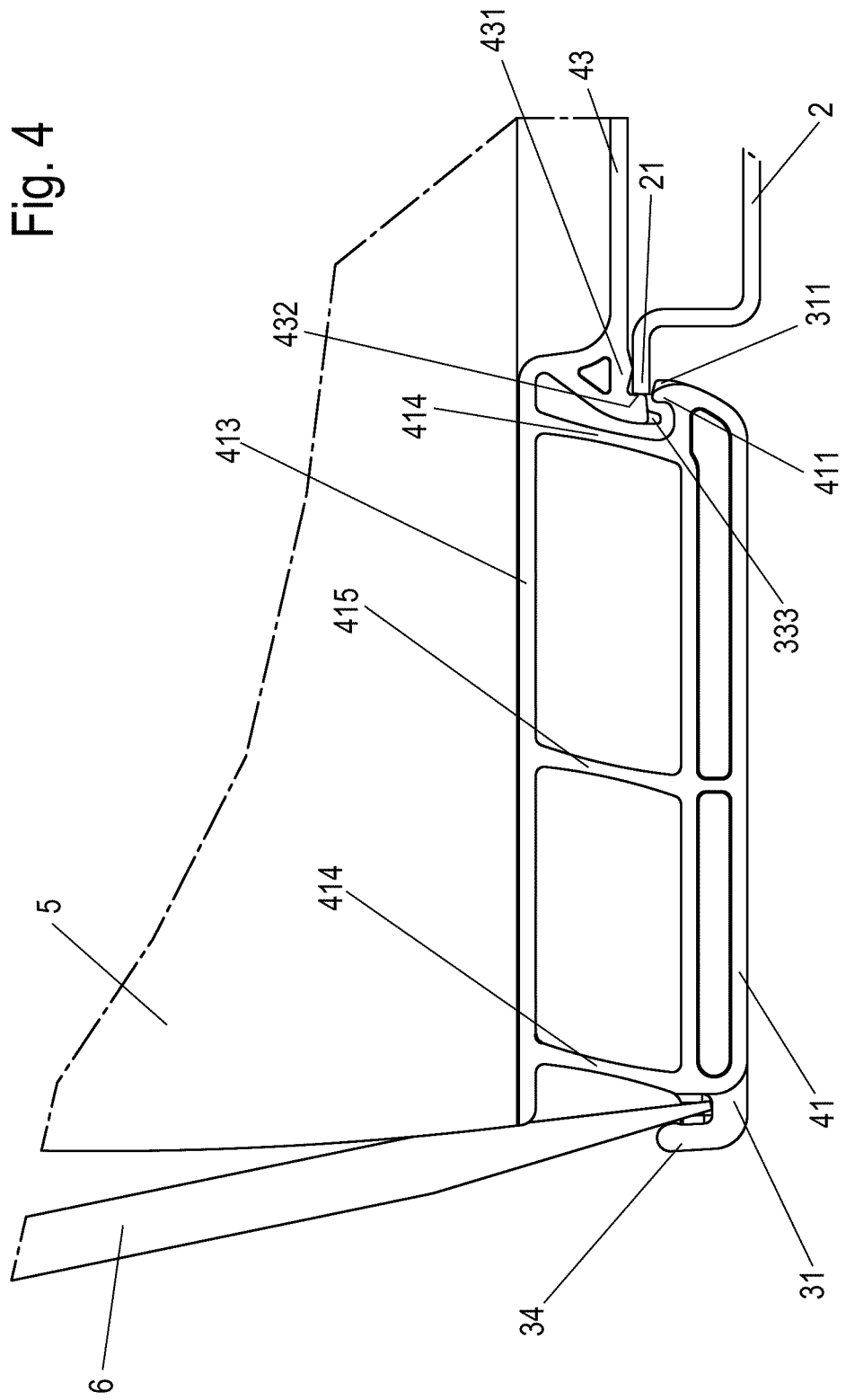
FIG. 4 shows a side view of the latching foot group on a support rail in the latched state.
Figure 5:
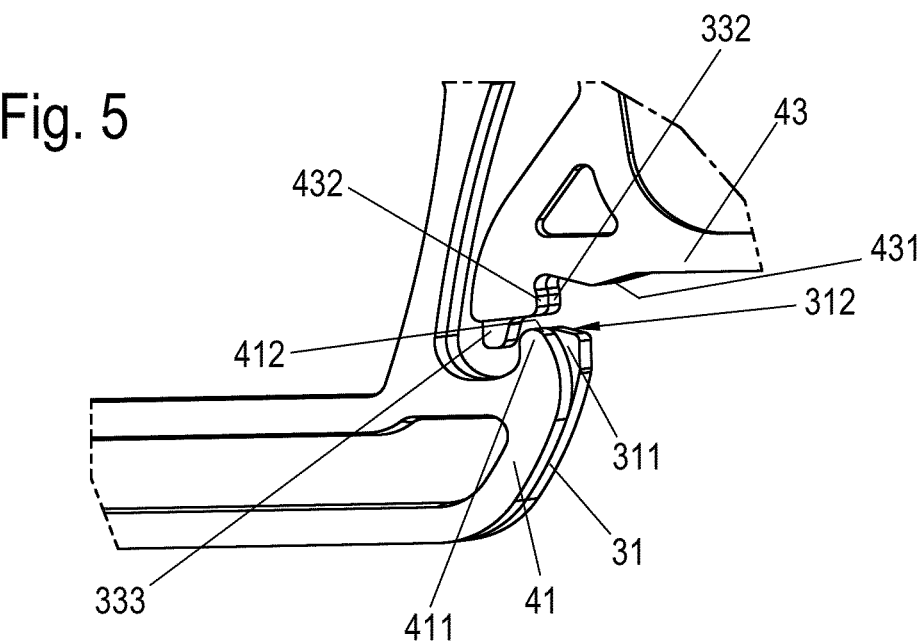
FIGS. 5 and 6 show perspective views of a detail of the latching foot group for displaying the latching of the first damping parts on the support rail.
Figure 6:
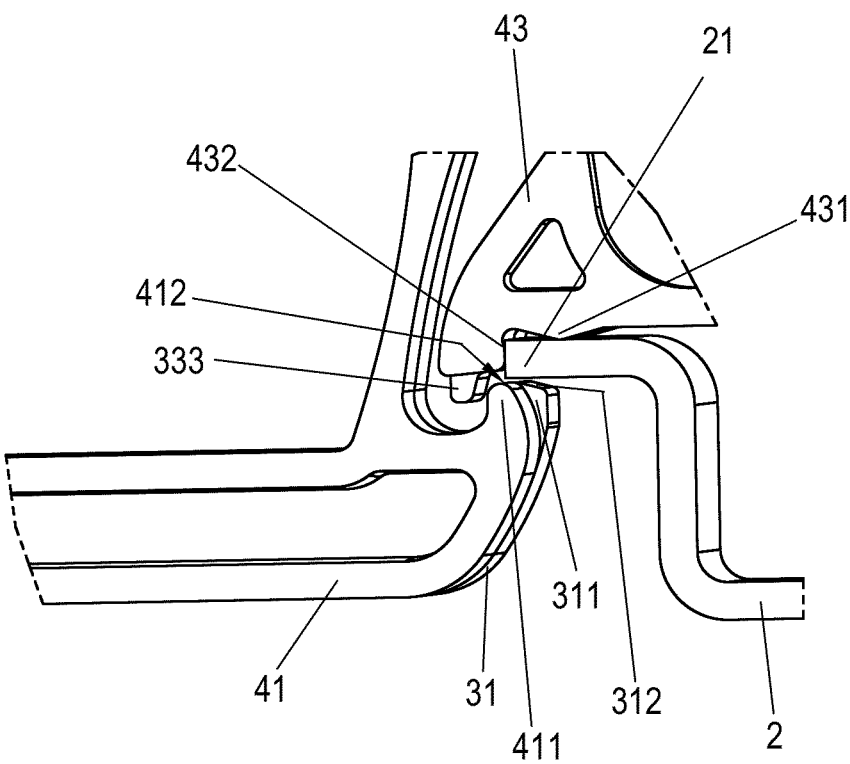

As shown in the detailed views of FIGS. 4 to 6, a latching finger 311, 411, which engages behind the support rail 2 when the latching feet 3, 4 are latched, grasped or otherwise mounted onto the support rail 2, is integrally formed on the first clamping part 31, 41 of each of the latching feet 3, 4, which latching finger, in the latched state of the latching feet 3, 4 on the support rail 2, presses one of the free outer edges 21 of the support rail against a latching rail 33, 43 of the latching feet 3, 4.

Figure 2:
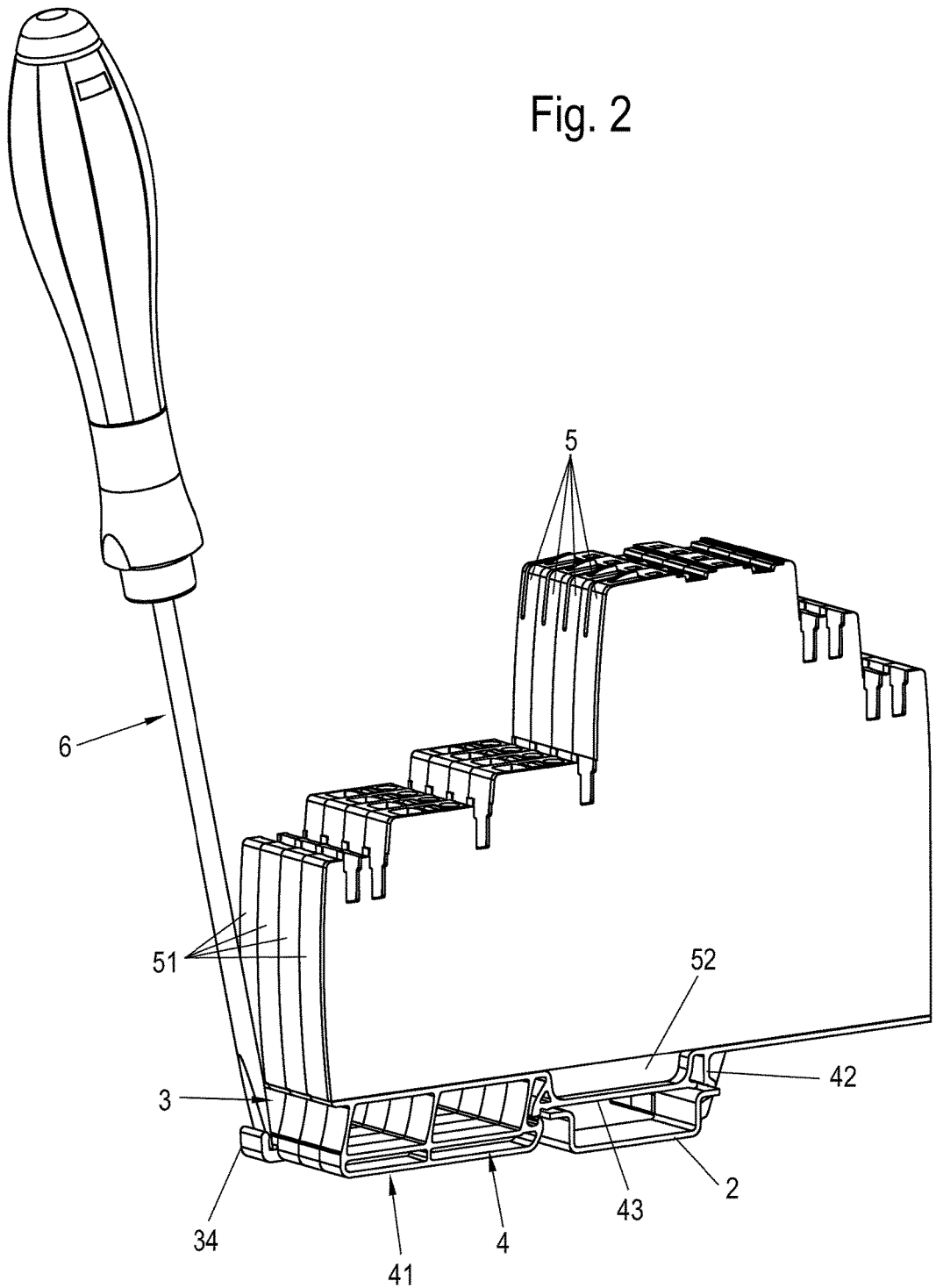
FIG. 2 shows a perspective view of the assembly with a latching foot group attached thereto and with an unlatching tool applied to a first latching foot.
Figure 3:
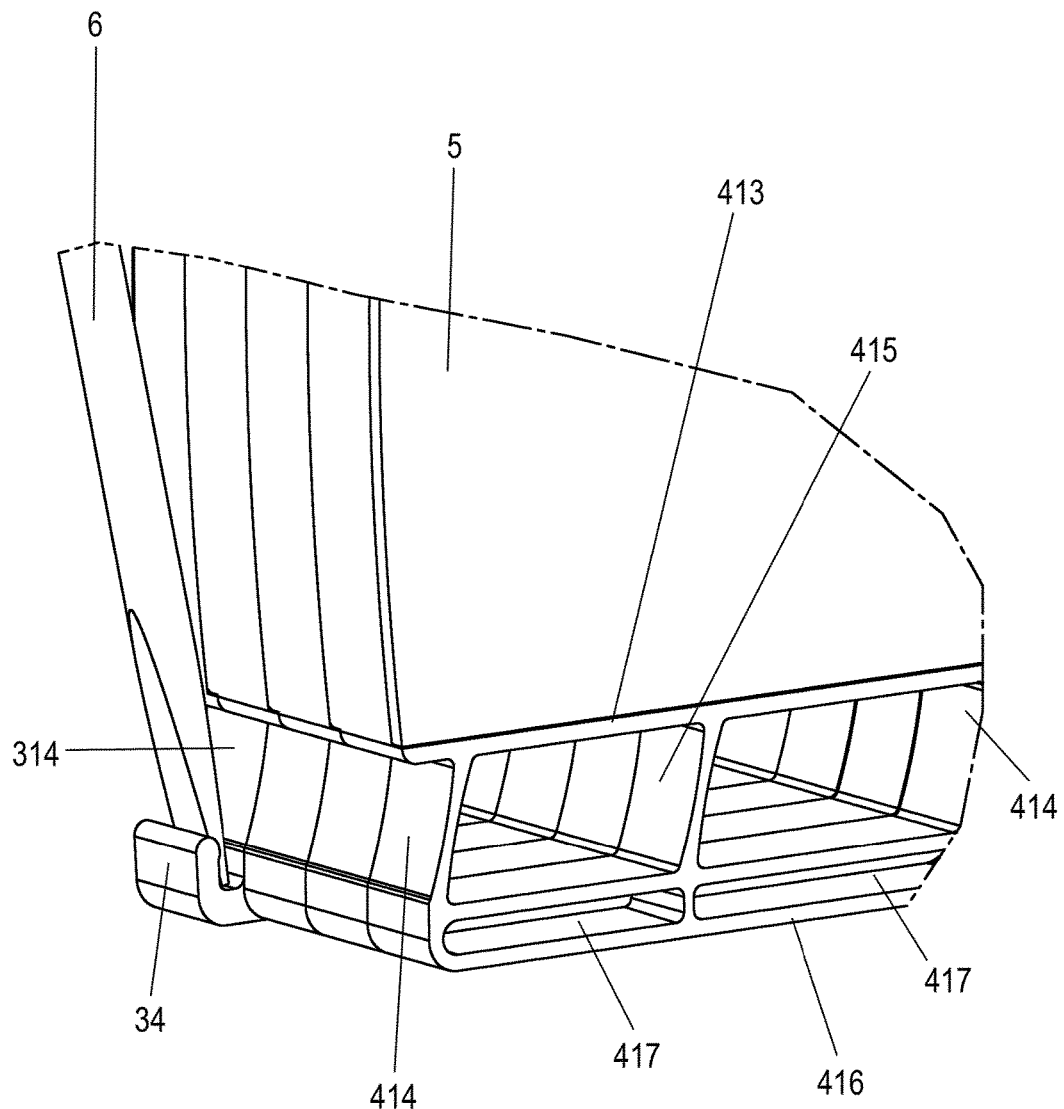
FIG. 3 shows a perspective view of a part of the latching foot group with a tool receiving area formed on the first latching foot.
Figure 7:
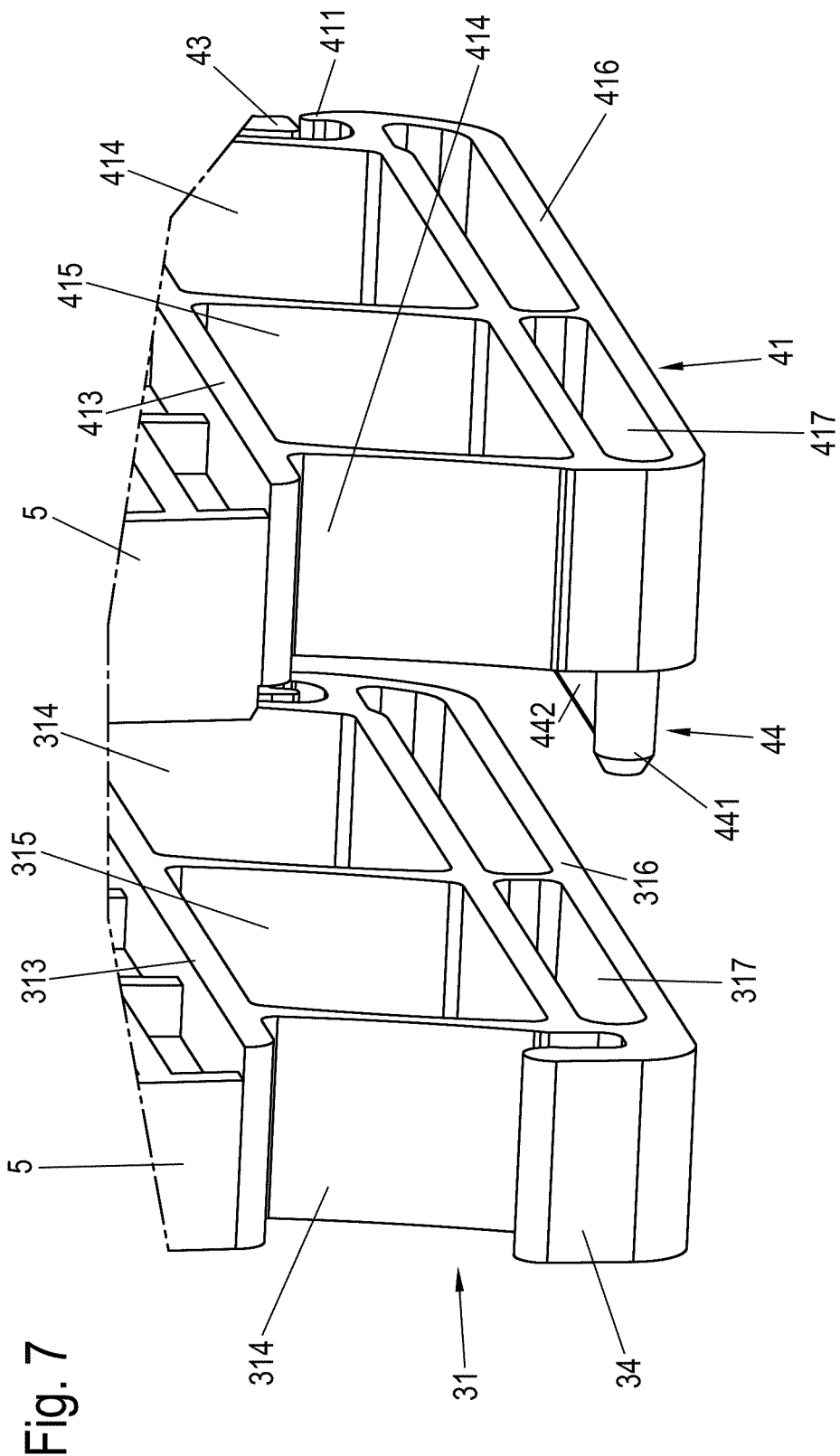
FIG. 7 shows a perspective view of a part of the first latching foot and a part of the second latching foot in the disassembled state with representation of the recesses and a plug element that can be inserted therein.
Figure 8:
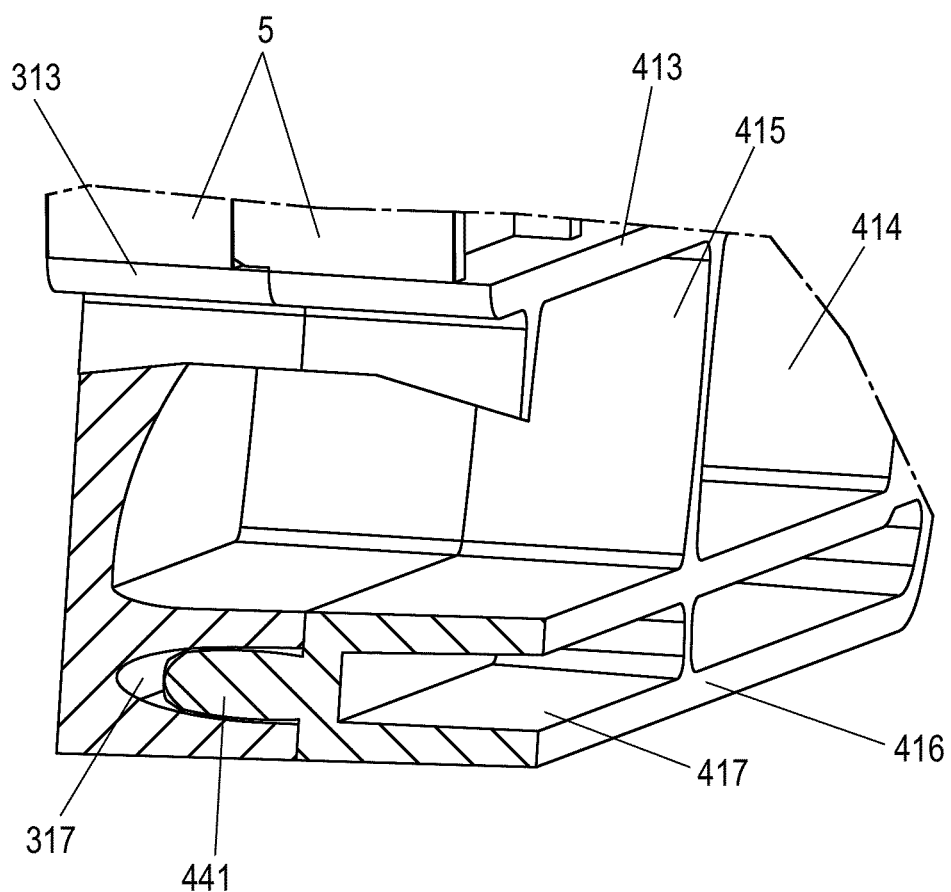
FIG. 8 shows a sectional view through the latching feet in the assembled state, which are shown in FIG. 7 in the disassembled state.

At least the first clamping parts 31, 41 of the latching feet 3, 4 are connectable in an interlocking manner to form a latching foot group, as shown in FIGS. 7 and 8. In order to release such a latching foot group 1 in a simple manner from the support rail 2, as shown in FIGS. 2 to 4, only the first clamping part 31 of the first latching foot 3 has a tool receiving area 35 for the application of an unlatching tool 6, e.g. in the form of a screwdriver, by means of which the entire latching foot group 1, which is composed of a plurality of latching feet, can be disengaged from the support rail 2 upon actuation of the unlatching tool 6.

To further facilitate such an unlatching operation, the latching finger 311 of the first clamping part 31 of the first latching foot 3, as shown in FIGS. 5 and 6, comprises a support surface 312 extending in the direction of the second clamping part 32 for supporting the support rail 2 in the latched state, which extends somewhat further than a support surface 412 for supporting the support rail 2 in the latched state of the latching finger 411 of the first clamping part 41 of the at least one second latching foot 4.

The first clamping part 31, 41 of the latching feet 3, 4, as can be clearly seen in FIGS. 1 to 4 for example, is preferably shaped like a frame.

In this case, a plurality of spring legs 314, 414 extend from the upper housing part 51 away from a base web 313, 413, which forms the transition to the upper housing part 51, and are connected to one another at their ends remote from the base web 313, 413 by a connecting web 316, 416.

In this case, the spring legs 314, 414 are preferably arranged not obliquely at right angles to the base web 313, 413 and the connecting web 316, 416, but are arranged obliquely at an acute angle from the base web 313, 413 in the direction of unlatching movement x of the first clamping part 31, 41, so that the latching fingers 311, 411, in the case of an unlatching or unlatching movement triggered by the unlatching tool 6, are not moved parallel to the base web 313, 413, but also slightly towards the base webs 313, 413.

The first latching foot 3 is preferably positioned on an outer side of the latching foot group 1. It is also conceivable, however, to arrange the first latching foot 3 in the centre of the latching foot group 1, which latching foot is provided with the tool receiving area 35. The term centred shall be understood in this case as any position between second latching feet 4, which are arranged on the outer sides of the latching foot group, without the tool receiving area 35.

For the further stiffening of the frame shaped clamping part 31, 41, the first clamping part 31, 41 of the latching feet 3, 4 has at least one stiffening web extending between the base web 313, 413 and the connecting web 316, 416.

As shown in FIGS. 7 and 8, the connecting webs 316, 416 of the first clamping parts 31, 41 have at least one recess 317, 417 for receiving at least one plug element 44 on a first surface facing a first clamping part 31 of a second latching foot 4.

This plug element 44 protrudes in this case from the recess 317, 417 of the adjacent latching foot 3, 4. The plug element 44 preferably extends over the entire width of the recess 317, 417.

The corner regions of the recesses 317, 417 are preferably formed in a rounded manner. Correspondingly, the plug element 44 is provided on its free side edges with preferably cylindrical plugs 441, between which the plug element 44 extends as a plate-shaped element 442.

Important here is the interlocking engagement of the plug element 44 into the respective recess 317, 417 in order to bring about sufficient stiffening in the latching or unlatching direction x of the latching foot group 1.

The tool receiving area 35, as shown in FIG. 7 for example, is preferably formed as a receiving groove, which is formed by a clamping web 34 arranged on the connecting web 316 of the first clamping part 31 of the first latching foot 3 and a spring leg 314 adjacent thereto.

For simple actuation, the tool receiving area 35 is provided on an end of the first clamping part 31 remote from the second clamping part 32.

The head of the tool 6, for example the screw head of the screwdriver, is inserted into this receiving groove for unlatching the latching foot group 1, and by screwing a neck of the tool against a front wall of the housing upper part 51, the screw head and thus the first clamping part 31, 41 of the latching feet 3, 4 are pressed in the unlatching direction x of the latching foot group 1, wherein the latching fingers 311, 411 are moved away beneath the latching rails 33, 43 laterally in the unlatching direction x of the latching foot group 1 and release the first free outer edge 21 of the support rail 2, which is in contact with the first clamping parts 31, 41 in the latched state.

For the clamping of the support rail 2, the latching rail 33, 43 is integrally formed between the clamping parts 31, 32, 41, 42. In this case, contact surfaces 331, 431 are provided opposite the latching fingers 311, 411 on the latching rail 33, 43 for generating a counter-pressure, so that the first free end 21 of the support rail 2, which can be latched with the first clamping part 31, 41, can be clamped between the latching fingers 311, 411 of the first clamping parts 31, 41 and the contact surfaces 331, 431 of the latching rail 33, 43.

The second free end 22 of the support rail 2 is accommodated in a groove of a web 42 of the second clamping part 32, 42.

While the preferred forms and embodiments of the invention have been illustrated and described, it will be appreciated by those of ordinary skill in the art that various changes and modifications may be made without deviating from the inventive concepts set forth above.

The invention claimed is:

1. A latching foot group for an electrical assembly, comprising a plurality of latching feet which are arranged adjacent to one another and can be latched onto a support rail, comprising
   a first latching foot,
   at least one second latching foot,
   wherein each of the latching feet has a resiliently configured first clamping portion and a second clamping portion, between which the support rail is latched,
   wherein a latching finger engaging behind the support rail when the latching feet are latched onto the support rail is integrally formed on the first clamping portion of each of the latching feet,
   wherein
   the first clamping portions of the latching feet are connected to one another in an interlocking manner,
   wherein only the first clamping portion of the first latching foot has a tool receiving area for applying an unlatching tool,
   wherein the latching finger of the first clamping portion of the first latching foot has a support surface for supporting the support rail in a latched state, said support surface extending farther in the direction of the second clamping portion than a support surface for supporting the support rail in the latched state of the latching finger of the first clamping portion of the at least one second latching foot.

2. A latching foot group according to claim 1, wherein the first clamping portions of the latching feet are formed in a frame-shaped manner, having at least two spring legs which extend from a base web and which are connected to one another at their ends remote from the base web by a connecting web.

3. A latching foot group according to claim 2, wherein the connecting webs comprise at least one recess for accommodating at least one plug element on a first surface facing a first clamping portion of a second latching foot, wherein the at least one plug element protrudes from a side surface of the first clamping portion of the at least one second latching foot, said side surface facing away from the recess.

4. A latching foot group according to claim 3, wherein the width of the plug element in the latching or unlatching direction corresponds to the width of the recess.

5. A latching foot group according to claim 4, wherein sides of the plug element extending in the plug-in direction engage in the inserted state in an interlocking manner into corner regions of the recess.

6. A latching foot group according to claim 5, wherein plugs are integrally formed on the sides of the plug element which extend in the ping-in direction and are connected to one another by a plate-shaped connecting web.

7. A latching foot group according to claim 1, wherein the first clamping portion of the first latching foot has at least one stiffening web extending between the base web and the connecting web.

8. A latching foot group according to claim 1, wherein the tool receiving area is designed as a receiving groove between a clamping web arranged on the connecting web of the first clamping portion of the first latching foot.

9. A latching foot group as defined in claim 8, wherein the tool receiving area is arranged on an end of the first clamping portion remote from the second clamping portion.

10. A latching foot group as defined in claim 1, wherein the clamping portions are arranged on mutually opposite sides of a latching rail.

11. A latching foot group as defined in claim 1, wherein the first latching foot is positioned on an outer side of the latching foot group.

12. A latching foot group as defined in claim 1, wherein the first latching foot is positioned centrally in the latching foot group.

13. A latching foot group as defined in claim 1, wherein the latching feet are produced as injection-molded parts.

14. An electrical assembly including a latching foot group as defined in claim 1.

* * * * *